July 21, 1942.  R. B. SHAFER  2,290,574
MOISTURE MEASURING DEVICE
Filed Feb. 7, 1940
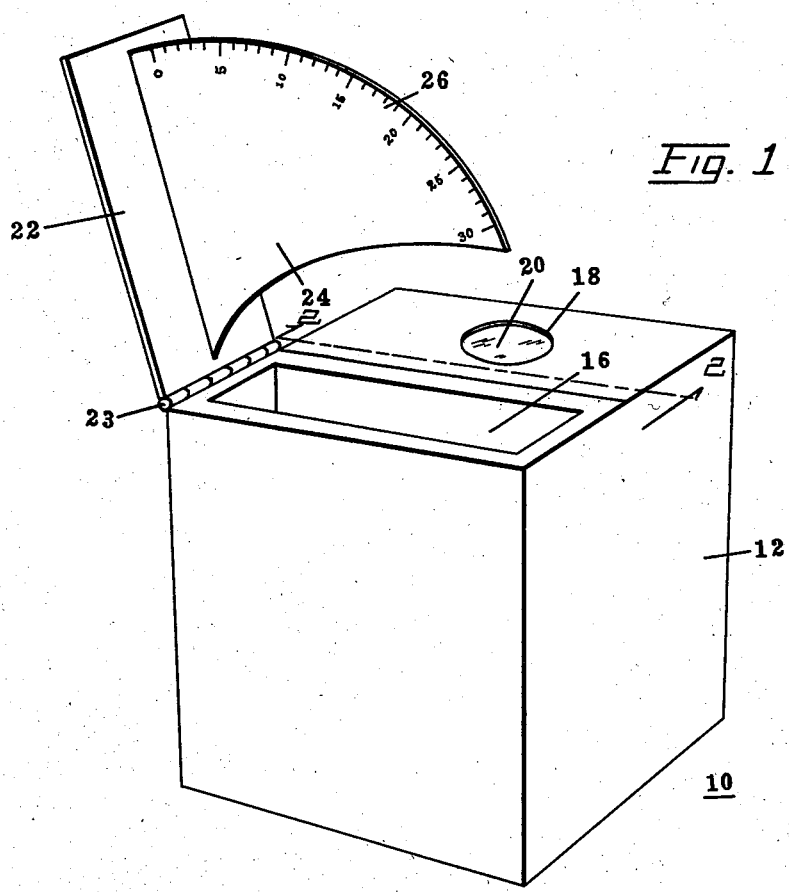
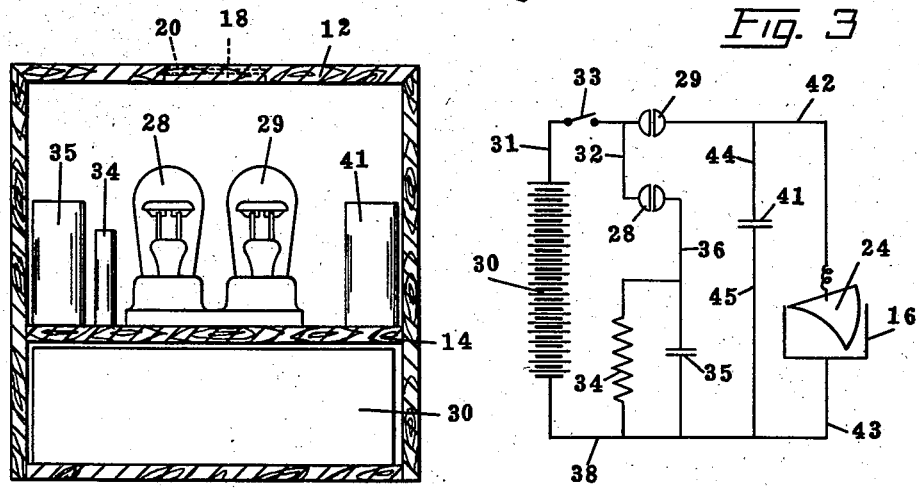
INVENTOR
Robert B. Shafer
BY
Warren H. F. Schmieding
ATTORNEY Patented July 21, 1942

2,290,574

UNITED STATES PATENT OFFICE 2,290,574

MOISTURE MEASURING DEVICE

Robert B. Shafer, Greenwich, Ohio, assignor to Shafer Electrical Instrument Co., Greenwich, Ohio, a corporation of Ohio Application February 7, 1940, Serial No. 317,725

11 Claims. (Cl. 175—183)

The present invention relates to an apparatus and method of measuring the moisture content of readily mobile materials, i. e., materials capable of flowing such as grains or fluids and the like.

An object of the invention is to provide an improved method of and apparatus for measuring the moisture content of mobile materials. In carrying out this object, I provide an electrically responsive indicating device having a regulating circuit therefor and an electrode connected in the circuit, which electrode is adapted to be embedded varying depths in the material to be tested to vary the resistance in the circuit, and I provide an indicator associated with the electrode for indicating the area of the electrode embedded in the material whereby the moisture content can be computed from the indicator.

A further object of the invention is to provide the indicator device of two signal circuits, one of which is adapted to produce a signal at predetermined intervals or at a fixed frequency and the other signal circuit includes the material to be tested and a movable electrode adapted to be embedded at varying depths in the material so as to vary the resistance of the second circuit whereby the signal thereof will operate in synchronism with the first mentioned signal.

Another object of the invention is to form the electrode in a wedge shape so that, as it is progressively embedded in the material to be tested, the area of the surface thereof in contact with the material will be progressively increased.

Still another object of the invention is to provide in an apparatus for measuring the moisture content in mobile materials, a container for holding the material to be tested, an electrode hinged adjacent the opening in the container, which electrode is adapted to be lowered into the material in the container, and to provide an indicator associated with the electrode for indicating the area of the electrode embedded in the grain.

Other and further objects and advantages will be apparent from the following description, reference being had to the accompanying drawing wherein a preferred form of embodiment of the present invention is clearly shown.

In the drawing:

Fig. 1 is a perspective view of a moisture measuring apparatus;

Fig. 2 is a sectional view taken on line 2—2 of Fig. 1; and,

Fig. 3 is a wiring diagram of the apparatus.

Referring to the drawing, an apparatus 10, is shown, for measuring the moisture content of materials as for example grain, flour, liquids, and granular-like materials that are mobile in character. Parts of the apparatus 10 are housed in a box 12, which box is preferably formed of wood, although it may be formed of other suitable material. A shelf 14 is provided in the rear portion of the box for supporting various elements of the apparatus. A container or well 16 is provided in the forward portion of the box for holding the material to be tested. The well 16 has a depth substantially the full depth of the box and is lined with sheet metal for providing an electrical connection with the material in the well.

An opening 18 is provided in the top of the box, which opening is covered by a glass plate 20.

A lid 22 is hinged on the box 12, by hinges 23, which hinges are electrically insulated from the metal lining of the well by the wood forming the box. An electrode 24 is attached to the lid 22 and when the lid is closed over the opening of the well 16, the electrode 24 extends down into the center of the container. Preferably the electrode is wedge, or half-crescent shaped.

A scale 26 is provided along one edge of the electrode 24. In the present embodiment the scale is divided into thirty units.

Two electrically responsive indicators or signals are provided, one of which is regulated by a circuit in which the electrode 24 is connected. In the form of embodiment of the invention shown the signals comprise two, two watt neon lamps 28 and 29 each of which are connected in oscillator circuits for producing intermittent flashing of the lamps. The two oscillator circuits are adapted to be energized by a battery 30, which battery is adapted to provide a current of approximately 150 volts. One of the electrodes of the neon lamp 28 is connected with one terminal of the battery through wires 31 and 32. A switch 33 is connected in the wire 31 for controlling energization of the lamp circuits. The other electrode of the lamp 28 is connected in series circuit with a resistance 34 and a condenser 35 by a wire 36. The resistance and condenser are arranged in parallel circuit relation and are connected with the other terminal of the battery by a wire 38.

One electrode of the lamp 29 is connected with one terminal of the battery 30 through the wire 31 and switch 33. The other electrode of the lamp 29 is connected in series with a condenser 41 and the electrode 24 by wires 44 and 42, respectively. The metal lining of the well 16 is connected with the other terminal of the battery 30 by the wires 43 and 38. The condenser 41 is connected in a circuit parallel with the electrode 24 and the well lining and is connected with the battery 30 by wires 45, 43 and 38.

In the preferred embodiment of the invention the resistance 34 has a value of 11 meg. ohms and the capacity of each of the condensers 35 and 41 is 0.5 M. F. D.

When the switch 33 is closed, the potential across the electrodes of the lamp 28 causes a flow of current through the lamp which lights the lamp. This flow of current charges the condenser, and when the condenser is charged to a predetermined amount, the flow of current is insufficient to maintain the lamp lit. The resistance 34 is sufficiently high to prevent the flow of adequate current for maintaining the lamp lit. The condenser then discharges through the resistance 34 which causes an increase in the potential across the electrodes of the lamp 28. Sufficient current will again flow to the condenser to cause the lamp to light and the lamp will remain lit until the condenser is recharged to said predetermined amount. Preferably the time interval for discharging the condenser is considerably longer than that of charging the same and, in actual practice, the lamp flashes for example, every second.

The oscillator circuit for the lamp 29 is similar to the circuit for the lamp 28. The resistance in the oscillator circuit for lamp 29 is formed by the material to be tested. The well 16 is filled with the material to be tested, as for example wheat, and the electrode 24 is inserted in the grain to complete the circuit through the grain. Thus the grain will serve as a resistance, which resistance will be affected by the amount of moisture present in the grain. Also the resistance is varied by varying the area of the electrode embedded in the grain. When the electrode 24 is embedded in the grain in the well 16, the lamp 29 is flashed at intervals in a manner similar to the lamp 28. When the switch 33 is closed a high potential exists across the electrodes of the lamp 29 and current flows through the lamp to cause the lamp to light. The resistance offered by the grain causes the condenser 41 to be charged. When the condenser is charged a predetermined amount, the potential across the electrodes of the lamp 29 is insufficient to maintain the lamp lit. The condenser then discharges through the grain which causes an increase in potential across the electrodes of the lamp. Current then flows through the lamp to charge the condenser and causes the lamp to be lighted. Thus the lamp 29 will be flashed as the condenser 41 is charged. The frequency of the flashes of the lamp 29 is determined by the value of the resistance in the circuit that includes the electrode 24 and the grain. The lower the resistance, the more readily the condenser 41 is discharged and consequently the lamp will flash frequently. As the resistance is increased the discharge of the condenser is slower and the flashes of the lamp 29 will be less frequent. When the resistance through the grain is equal to the resistance 34, the lamps will flash at the same frequencies.

It is to be noted that a common source of current for lighting the lamps is provided so that any variation in the current from that source will affect both lamps in a like manner and this variation will not interfere with proper operation of the apparatus.

In measuring the moisture content of the grain, the electrode 24 is inserted in the grain by lowering the lid 22. As the pointed end of the electrode enters the grain first only a small area of the electrode is embedded in the grain and resistance through the electrode and grain will therefore be of a relatively high value. As the electrode is progressively inserted in the grain the resistance is progressively decreased due to the increase in area of the electrode contacting the grain. When the electrode 24 is embedded in the grain to a depth at which the two lamps are flashing at the same frequencies, which may be determined by observing the lamps through the opening 18, a reading is made on the scale 26 by noting the figure or unit of the scale opposite the top edge of the well 16. When the lamps flash at the same frequency, the value of the current, flowing through the material being measured, is equal to that flowing through resistance 34. A chart is prepared based on the resistance offered by the particular material being measured having a known moisture content and the area of the electrode required to be embedded in the material to offer a resistance equal to the known resistance 34. This chart includes the indicia of the scale 26 and the paired off percentages of moisture corresponding to the embedded area of the electrode indicated by the scale. Obviously different charts will be employed for different materials, such as a chart for wheat and a chart for corn. These charts may be attached to the under side of the lid 22. Thus by simply adjusting the electrode 24 so that the lamps flash at the same frequency and then reading the scale 26 and referring to the chart, the percentage of moisture in the grain may be ascertained.

A chart may be prepared for each type of material that is desired to be tested so that the apparatus may be utilized for testing the moisture content of many different materials.

While the form of embodiment of the present invention as herein disclosed constitutes a preferred form, it is to be understood that other forms might be adopted, all coming within the scope of the claims which follow.

I claim:

1. A device for measuring the moisture content of mobile material, such as grain, comprising in combination, an electrically responsive indicator; a circuit for controlling the indicator; a sheet type electrode in said circuit, said electrode being movable edgewise to various depths in the material to be tested; means for connecting the material with a source of electric current; and indicating means associated with the electrode for indicating the area of the electrode in contact with the material.

2. A device for measuring the moisture content of mobile material, such as grain, comprising in combination, an electrically responsive indicator; a circuit for controlling the indicator; a sheet type electrode in said circuit, said electrode having an irregular surface movable edgewise to varying depths in the material; means for connecting the material with a source of electric current; and indicating means associated with the electrode for indicating the area of the electrode in contact with the material.

3. A device for measuring the moisture content of mobile material, such as grain, comprising in combination, an electrically responsive indicator; a circuit for controlling the indicator; an electrode in said circuit, said electrode being adapted to be embedded at varying depths in the material, said electrode being wedge shaped for progressively increasing the area of the surface thereof in contact with the material as the electrode is progressively embedded in the material; means for connecting the material with a source of electric current; and indicating means associated with the electrode for indicating the area of the electrode in contact with the material.

4. An apparatus for measuring the moisture content of mobile material, such as grain, comprising in combination, electrically responsive means for producing a signal at predetermined intervals; an electrically responsive device for producing a signal periodically; means for controlling the frequency of the signal produced by the said device including, a circuit, means for connecting the circuit with the material to be tested, and a sheet type electrode connected in the circuit, said electrode being movable edgewise in the material to various depths to cause the said device to produce signals at said predetermined frequency; and indicating means associated with the electrode for indicating the area of the surface of the electrode contacting the material.

5. An apparatus for measuring the moisture content of mobile material, such as grain, comprising in combination, means forming an open container; an electrode hinged adjacent the opening and adapted to be moved about the hinge and into the container; and indicating means associated with the electrode for indicating the area of the surface of the electrode extending into the container.

6. An apparatus for measuring the moisture content of mobile material, such as grain, comprising in combination, means forming an open container; an electrode hinged adjacent the opening and adapted to be moved about the hinge and into the container, said electrode being wedge shaped; and indicating means associated with the electrode for indicating the area of the surface of the electrode extending into the container.

7. An apparatus for measuring the moisture content of mobile material, such as grain, comprising in combination, an electrically responsive indicator; a source of electric current; a circuit for controlling the indicator, said circuit being connected with the source of current; a container for said material; an electrode in the container for connecting the material in the circuit; a movable sheet type electrode connected in said circuit, said movable electrode being adapted to be inserted edgewise into the material in the container, and an indicating scale on said electrode, said scale cooperating with the edge of the container for indicating the area of the surface of the electrode inserted in the material.

8. A device for measuring the moisture content of mobile material, such as grain, comprising in combination, an electrically responsive indicator; a circuit for controlling the indicator; said circuit including an electrode adapted to have one surface thereof covered by a body of material to be tested and another electrode movable into said body of material in a plane substantially parallel with said surface; means for energizing said circuit; and indicating means associated with the movable electrode for indicating the area of the movable electrode in contact with the material between the two electrodes.

9. The steps in the method of determining the moisture content of mobile material, such as grain, which consists in establishing a signal circuit having a fixed frequency of signalling, establishing a second signal circuit by causing a circuit to be completed between the material to be tested and two electrodes, and synchronizing the signals of the two circuits by varying the effective area of contacting surface between one of the electrodes and the material to be tested.

10. The steps in the method of determining the moisture content of grain and like material, which consists in establishing a circuit through the grain between two spaced electrodes, and varying the resistance of the circuit by varying the effective area of one of the electrodes contacting the grain while maintaining the length of the circuit through the grain between the electrodes substantially constant.

11. The steps in the method of determining the moisture content of grain and like material, which consists in establishing a circuit through the grain between two spaced electrodes, varying the effective area of one of the electrodes contacting the grain until a predetermined resistance is maintained in the circuit, and then computing the moisture content by the area of the electrode in the grain.

ROBERT B. SHAFER.